Aug. 22, 1972  A. S. HUBIN ET AL  3,686,050
METHOD AND APPARATUS FOR MAKING SEAMLESS
CROSS-BIAS REINFORCED TISSUE-FIBER
LAMINATES
Filed July 17, 1970  3 Sheets-Sheet 2

INVENTORS:
ANTHONY S. HUBIN
HARLAN W. HIRSCHY
BY
Wolfe, Hubbard, Leydig, Voit & Osann
ATTORNEYS.

Aug. 22, 1972　　A. S. HUBIN ET AL　　3,686,050
METHOD AND APPARATUS FOR MAKING SEAMLESS
CROSS-BIAS REINFORCED TISSUE-FIBER
LAMINATES
Filed July 17, 1970　　　　　　　　　　　3 Sheets-Sheet 3
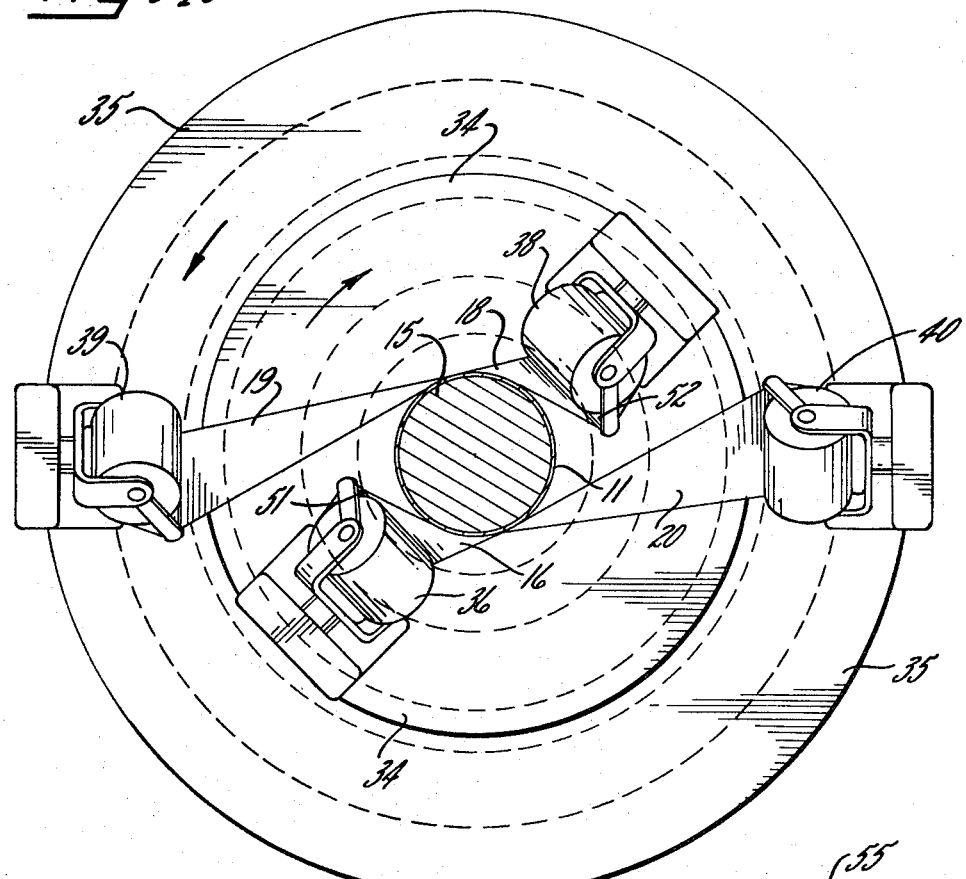
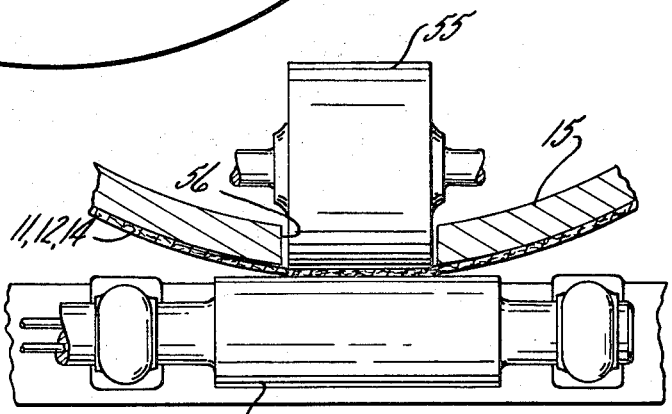
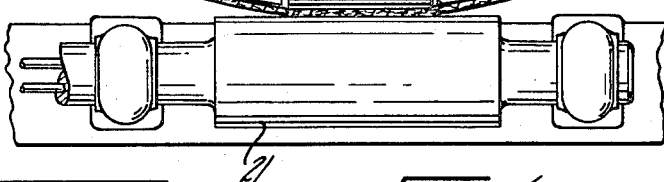
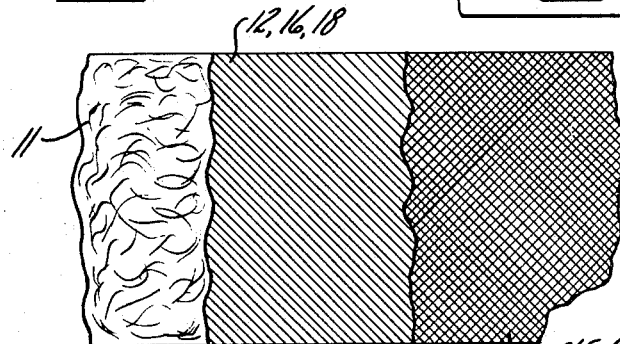
INVENTORS.
ANTHONY S. HUBIN
HARLAN W. HIRSCHY
BY
Wolfe, Hubbard, Leydig, Voit & Osann
ATTORNEYS.

United States Patent Office 3,686,050
Patented Aug. 22, 1972

3,686,050
METHOD AND APPARATUS FOR MAKING SEAMLESS CROSS-BIAS REINFORCED TISSUE-FIBER LAMINATES

Anthony S. Hubin, Appleton, and Harlan W. Hirschy, Neenah, Wis., assignors to Kimberly-Clark Corporation, Neenah, Wis.
Filed July 17, 1970, Ser. No. 55,845
Int. Cl. B65h 81/02
U.S. Cl. 156—174
11 Claims

ABSTRACT OF THE DISCLOSURE

A seamless, wrinkle-free, cross-bias reinforced, porous nonwoven laminate made by shaping a web of cellulosic wadding longitudinally around a cylindrical mandrel, counter-orbiting second and third webs of thermoplastic adhesive-patterned drafted fibers around the mandrel to form opposite helices, heating the first web to laminate the webs near the edges of the first web, and severing the second and third webs along the length of the first web to produce the laminate.

INTRODUCTION

This invention relates to nonwoven fabric laminates, and more particularly concerns the manufacture of seamless, wrinkle-free, cross-bias reinforced, nonwoven laminates. Specifically, the invention concerns method and apparatus for making such laminates, and the resulting seamless, wrinkle-free product.

In the manufacture of nonwoven fabric laminates, it is often desirable to provide a product in the form of an elongated web of a base material that is bias-reinforced with one or more transverse layers of reinforcing material. Generally, this is accomplished by placing the base web on a mandrel and laying the reinforcing web or webs at an angle to the base web. Since the laminates must be manufactured at high speed and at minimum cost, various ingenious proposals have been suggested for bias-laying reinforcing materials.

Customarily, existing techniques usually involve placing the base web on or around a flat or a circular mandrel, and serving one or more reinforcing webs over the base. Where the mandrel is flat, a product laminate can be made having the same width as the original base web, but the necessity of frequent changes in reinforcing web direction necessarily produce rapid acceleration and deceleration of serving mechanisms which produce undesirable pulsations in the equipment. On the other hand, where the mandrel is circular, pulsations are avoidable, but inherent difficulties in placing and withdrawing the base web with respect to the mandrel usually produce undesirable wrinkling or puckering at the selvedges of the laminate. Various other techniques for solving the pulsation problem and the wrinkling problem have been proposed, but usually introduce other undesirable features such as reducing the product width, producing transverse seams in the product, or requiring complex and expensive equipment.

Much of the difficulty can be traced to the inelastic nature of the base and the reinforcing webs. Uncreped cellulosic wadding, which is a common base web, and highly drafted fibrous reinforcing plies, are limited in their elastic extensibility, and accordingly present serious difficulties in conforming or applying the several webs to a mandrel and in withdrawing the finished laminate as a flat sheet.

Accordingly, an object of the invention is to provide a method and apparatus for making seamless, wringle-free, bias-reinforced nonwoven laminates, which method and apparatus combine the wringle-free characteristics of flat mandrel techniques with pulsation-free characteristics of circular mandrel systems.

Another object is to provide such methods and apparatus capable of operating at high speed, without pulsating acceleration and deceleration of serving members, and without the attendant wear-producing vibrations and oscillations.

A further object is to provide method and apparatus for making seamless, wrinkle-free, bias-reinforced laminates having a product width equal to the width of the base web.

Still another object is to provide such method and apparatus for producing a seamless product web, having no, or essentially no, overlaps on the tissue surface.

A major object is to produce a seamless, wrinkle-free, cross-bias reinforced, porous nonwoven laminate from non-resilient base and bias layers.

Yet a further object is to provide a fiber-tissue laminate combining the softness, absorbability, and porosity of cellulosic wadding with the high tensile strength of bias-reinforcing drafted fiber layers.

An additional object is to provide a versatile method and apparatus for producing the aforesaid laminates, which method and apparatus are capable of high speed, low cost, operation and in which the inherent properties of several plies are utilized to produce a quality product attaining the full advantages contributed by the several plies. A related object is to provide such method and apparatus which are useful in making product webs of differing pre-selected characteristics and dimensions.

BRIEF DESCRIPTION OF DRAWINGS

Other objects, aims, and advantages of the invention will be apparent from the following detailed description taken in connection with the accompanying drawings, in which:

FIG. 4 is a sectional view taken along line 4—4 of FIG. 1;

FIG. 6 is an enlarged sectional view, taken along line 6—6 of FIG. 1, depicting an exemplary heated calender;

FIG. 7 is an enlarged top sectional view of a seamless cross-bias reinforced laminate according to the invention.

Figure 1:
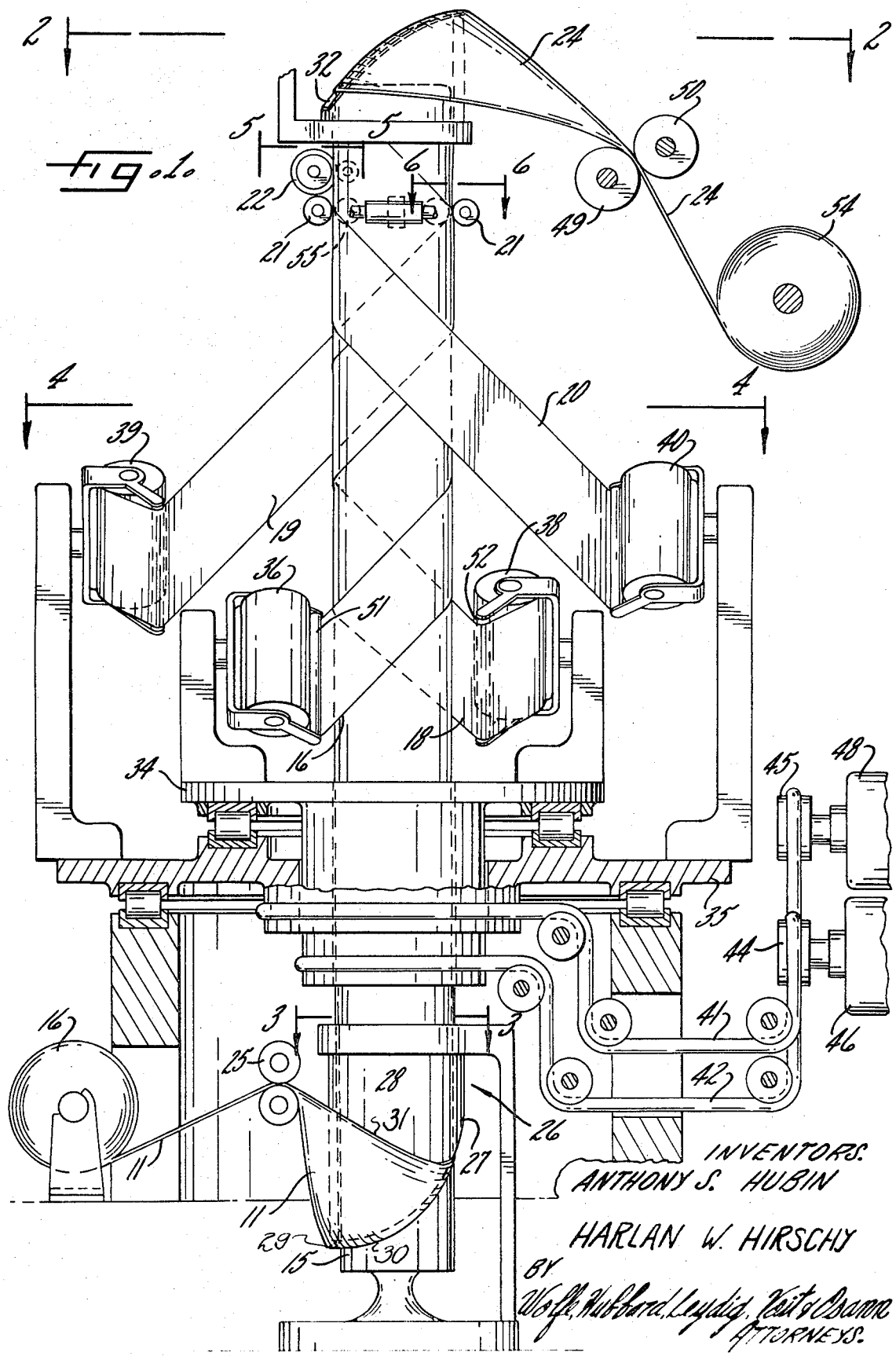
FIG. 1 is a frontal view, partly in section, of a cross-bias reinforcing apparatus embodying the invention.

For convenience of presentation of FIG. 1, the slitter disk 22 (and the superimposed assembly) is shown as cutting the cylinder directly opposite the edges of the web 11. In practice, it is usually preferable to cut along the edges of the web 11.

While the invention will be described in connection with a preferred embodiment, it will be understood that it is not intended to limit the invention to this particular embodiment. On the contrary, it is intended to cover all alternatives, modifications, and equivalent arrangements as may be included within the spirit and scope of the invention.

DESCRIPTION OF THE INVENTION

Figure 2:
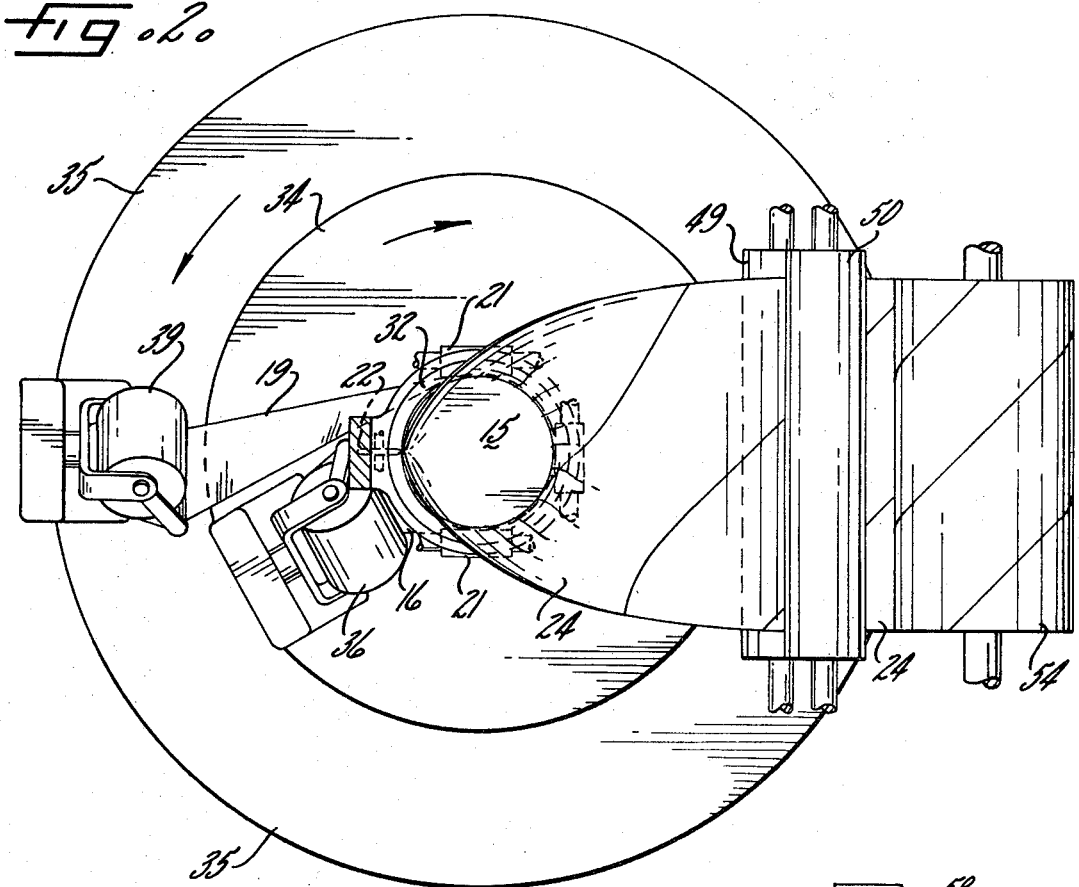
FIG. 2 is a top view, taken long line 2—2 of FIG. 1, of the apparatus depicted in FIG. 1.

Turning now to the drawings, and referring first to FIG. 1 and its auxiliary views depicted in FIGS. 2 and 4, there is shown an exemplary apparatus for making a seamless, wrinkle-free, cross-bias reinforced, porous nonwoven laminate. The final laminate, as shown in FIG. 7, has a base web 11 of seamless cellulosic wadding, which is reinforced by cross-bias reinforcing plies 12, 14, each made of self-supporting sheets of highly drafted synthetic fibers.

In general, the apparatus of FIG. 1 includes an elongated cylindrical mandrel 15, shown in an upright position, with provisions for serving the base and bias-reinforcing webs onto the mandrel. The cellulosic base web 11, of a width substantially equal to the circumference of the cylindrical mandrel 15, is served from a parent roll 16 and continuously shaped around the mandrel 15 in a longitudinal direction. As the shaped web 11 is drawn upward along the mandrel 15, the mandrel and base web are helically wrapped, first in one direction and then in the opposite direction, with webs 16, 18 and 19, 20 of highly drafted synthetic fiber sheets to form opposite helical layers around the base web 11. The resulting cylindrical material is partly or completely laminated by a calender roll 21 (FIG. 6), as will be more fully described, severed along the edges of the first web 11 by a slitter disk 22 (FIG. 5), and withdrawn as a cross-bias reinforced laminated web 24.

The base web 11 is, as noted above, a seamless cellulosic wadding withdrawn from a parent roll 16. Cellulosic wadding is usually a wet-laid seamless material made from chemically pulped wood fiber and, depending on the desired characteristics of the final laminate, may have varying weights and textures. Ordinarily the wadding is uncreped, in which event it is characterized by being only slightly extensible, a feature which is useful for many purposes but which, unfortunately, tends to cause wrinkling and puckering when a sheet of wadding is reshaped from its flat planar form to conform with a mandrel.

Cellulosic wadding is avaliable in a variety of textures and thicknesses, some of which are described in Gresham U.S. 3,047,445. In its uncreped state, a light-weight wadding will weigh from about 1 to about 5 grams per square yard, while a moderate weight wadding weighs from about 5 to about 30 grams per square yard, in each case of a single layer. If desired, the wadding may be subjected to creping, as for example on a Yankee drum, to a crepe ratio illustratively between about 1.25 and about 2.25. Usually uncreped wadding has a substantially higher tensile strength in the machine direction than in the transverse direction, and a typical uncreped wadding weighing about 10 grams per square yard may have a tensile strength in the machine direction of 0.12 kilogram per 15 millimeter strip but a strength of only about 0.032 kilogram per 15 millimeter strip in the cross-direction. For this reason, reinforcement is all but essential.

In practicing the invention, either a single sheet of cellulosic wadding may constitute the base web 11, or a plurality of such sheets previously formed into a laminate may be used. In any event, processing of either a single-ply or a multi-ply sheet is effected in the same manner.

Figure 3:
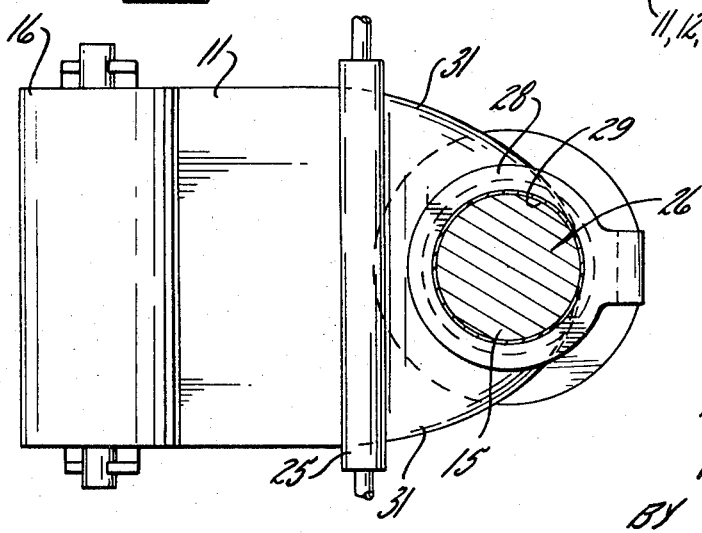
FIG. 3 is a partial sectional view, taken along line 3—3 of FIG. 1, of the apparatus of FIG. 1.

As shown in FIGS. 1 and 3, the cellulosic wadding base web 11, which is a seamless random fiber nonwoven sheet, is served from the parent roll 16 via an idler roll 25 onto a cylindrical mandrel 15. First, however, it is continuously shaped to change its configuration from a flat plane to an elongated cylinder having a circumference substantially equal to the width of the initial web 11.

Shaping is accomplished by the mandrel horn 26, as shown in FIGS. 1 and 3, acting as part of the folding collar 28. To effect this folding, the base web 11 is doubled over on itself around a relatively smooth edge portion 29 of the horn 26, and as the web 11 traverses the arcuate portion 30 of the horn 26 the edge portions 31 of the web 11 are folded inside the cylindrical shank 27 of the horn 26 and around the mandrel 15. This latter folding action is accomplished by passing the now-cylindrical web through the cylindrical aperture between the folding collar 28 and the mandrel 15. Otherwise stated, the original flat web 11 is bent around the horn 26 while the web edges 31 are being urged into a cylindrical or tubular configuration by advancing the web through the small space—only slightly larger than the thickness of the web 11—between the cylindrical shank 27 of the horn 26 and the cylindrical mandrel 15.

A particularly advantageous feature of the folding collar 28 is that it is capable of folding an essentially inelastic and only slightly extensible flat web into a cylindrical configuration. This is crucially important in the folding of uncreped cellulosic wadding, which has an elastic limit usually in the class of about ¼% to not more than about 5% in the machine direction or in the cross-direction. As a result, there is little or no tendency to exceed the elastic limit of the web, and consequently no likelihood of either distorting the web (which would produce wrinkles in the final laminate product) or actually tearing the web.

Furthermore, folding with a sailor's collar arrangement such as that shown in FIG 1 is effected with a horn 26 length of only about twice the diameter of the cylindrical mandrel or shank 27.

As the now-cylindrical web 11 passes through the cylindrical apertures between the horn 26 and the mandrel 15, the web travels longitudinally along the extended cylindrical mandrel 15 upon which additional plies of web material are to be wound. The mandrel 15 is preferably buffed and polished to present a surface of reduced frictional resistance and to enable the comparatively weak web 11 to traverse the length of the mandrel 15 with a minimum of resistance.

The mandrel 15 advantageously is of very slightly smaller diameter above the region of the folding collar 28. This difference in diameter need be only very slight, of the order of 1/32 inch or so, and is for the purpose of affording a somewhat looser fit of the cylindrical web 11 with respect to the mandrel 15. This, it will be appreciated, further minimizes frictional resistance along the mandrel 15.

As shown in FIG. 1, the mandrel 15 extends upward from the folding collar 28, through regions where reinforcing webs 16, 18 and 19, 20 are helically wrapped around the mandrel 15 and the superimposed base web 11, to the slitter disk 22 and a guide or spreader bar 32. Mandrel supports, not numbered, secure the lower end of the mandrel 15 to a machine frame or foundation.

The reinforcing webs 16, 18 and 19, 20 are served from their respective satellite rolls 36, 38 and 39, 40. As shown in the drawings, each pair of rolls is mounted on a counter-orbiting spindle, 34 in the case of the rolls 36, 38 and 35 in the case of the rolls 39, 40. These spindles 34, 35 are rotated coaxially with respect to the cylindrical mandrel 15, but in opposite directions, by appropriate drive belts 41, 42 associated with drive pulleys 44, 45 connected to motors 46, 48, respectively. Suitable bearings, typified by roller bearings 49, maintain smooth rotation of the spindles 34, 35.

The webs 16, 18 and 19, 20 each comprises self-supporting sheets of highly drafted synthetic fibers which have on one side a spaced open pattern of a thermoplastic adhesive. The sheets may be composed essentially of the fibers of a synthetic polymer are led from supply cans larly where a thicker laminate is desired, the fiber and adhesives are advantageously previously laminated to a layer of a base material such as cellulosic wadding. In this latter case, one surface of the laminate, preferably that on which the drafted fibers appears, has a surface application of the thermoplastic adhesive in order to permit the several reinforcing laminates to be secured to each other.

The drafted fiber of the webs 16, 18 and 19, 20 are formed into self-supporting sheets by techniques well-known in the art. In substance, multipjle slivers or staple fibers of a synthetic polymer are led from supply cans into a draw frame which comprises as series of pairs of grooved rolls, the rolls of each pair being driven by appropriate gearing at a peripheral rate of speed slightly faster than the rate of speed of the preceding pair. As the juxtaposed slivers pass sequentially through the pairs of rolls, the individual fibers are drafted, or aligned, and spread out to form a flat striated web of substantially aligned fibers. This web is fed to a supporting conveyor, on the surface of which a patterned thermoplastic adhesive has been previously applied, as for example by rotogravure techniques. The pattern may be regular or irregular, and continuous or discontinuous, it being only necessary that the adhesive secure adjacent fibers together so that the resulting layer is self-supporting after the adhesive has solidified.

A variety of different fibers may be used to form the highly drafted fibrous webs 16, 18 and 19, 20, and in turn the several webs may be of the same or different fiber and/or adhesive composition. Illustratively, the fiber sizes are in the range of about 0.5 and 10.0 denier, and the fibers themselves are illustratively composed of rayon, a nylon, a polyester such as polyethylene terephthalate, or a polyolefin such as oriented crystalline polypropylene. Optimally, the high drafted fibrous webs are as thick as a single fiber, although where more or less reinforcement is desired, each web may correspondingly have an average thickness of several fibers or may have an average thickness of less than the diameter of one fiber.

Correspondingly, a variety of thermoplastic adhesives may be employed to form a self-supporting sheet from the drafted synthetic fibers. The particular adhesive is dependent upon the characteristic of the reinforcing fibers and of the seamless cellulosic wadding base web 11, as well as on the desired end use of the laminated product. In any event, the adhesive should be activatable and softened at temperatures which will not degrade the particular fibrous material being used.

While various well-known adhesives may be employed, advantages reside in the use of plastisols, which are colloidal dispersions of synthetic resins in a suitable organic ester plasticizer, and which under the influence of heat provide good binding power while remaining soft and flexible. Those found particularly useful for incorporation in the product of the invention include vinyl chloride polymers, and copolymers of vinyl chloride with other vinyl resins, plasticized by organic phthalates, sebacates, or adipates. These provide a fast-curing plastisol adhesive characterized by relatively low viscosity, low migration tendencies, and minimum volatility. Such adhesives remain soft and flexible after curing, and can be reactivated by subsequent heating.

Other adhesive systems may be employed, such as organisols, utilizing resins such as the vinyl chloride polymers and copolymers. Still others, including emulsions of thermoplastic resins such as acrylics and rubber-like compounds, illustratively ABS, have the requisite properties to serve as a bonding agent for the present system.

By way of illustration, suitable self-supporting reinforcing webs 16, 18 and 19, 20 may be made from Fortrell Type 400 staple fibers (Celanese Fibers Marketing Co., Charlotte, N.C.), having an approximate tenacity of 4.8 g.p.d., elongation at break of about 45–50%, loop tenacity of about 4.4 g.p.d., initial modulus of 40–45 g.p.d., yield stress of about 1.0 g.p.d., yield strain of about 3.78, specific gravity of 1.38, melting point of about 500° F., denier of about 2.25, and average fiber length of about 2½ inches. A suitable adhesive for this material is made from 100 parts by weight of Geon 135 polyvinyl chloride resin (B. F. Goodrich, Akron, Ohio), about 60 parts of G. P. 261 dioctyl phthalate plasticizer (Goodrich), 3.0 parts of Cab-O-Sil pyrogneic silica (Cabot Corp., Boston, Mass.), and about 2–4 parts of mineral spirits; the resulting viscosity is desirably about 3500–4000 cps. (Brookfield Viscometer, with No. 4 spindle at 20 r.p.m.). The plastisol is applied by rotogravure printing (intaglio roll having adhesive cells 0.006 inch deep by 0.028 inch wide) in diagonal lines ¼ inch apart in both directions to form a diamond pattern; the weight of the resulting web is about 12.8 grams per square yard, composed of about equal weights of fiber and adhesive.

By reason of the adhesive, the drafted fiber webs 16, 18 and 19, 20 are self-supporting. Their strength, however, is substantially greater in the machine direction than in the cross-direction by reason of fiber alignment. In the system of the invention, no transverse stresses are applied to these webs since the webs are withdrawn directly from their respective satellite rolls 36, 38 and 39, 40 as flat sheets and, in this form, contact the cylindrical base web 11 on the mandrel 15 as, to a first approximation, tangent planes. Any tendency for the adjacent fibers on one set of webs, for example webs 16, 18, to slip over the other set of webs is minimized by the opposite helical disposition of fibers in the other set of webs, for example webs 19, 20.

As noted earlier, in some instances either or both sets of aligned fiber webs 16, 18 and 19, 20 may have a previously laminated layer of cellulosic wadding on one (or both) sides of the web. In this event, the resulting laminated product has alternate layers of cellulosic wadding and of drafted reinforcing fibers. Materials of this type may be prepared by procedures now conventional in the art (see Sokolowski U.S. 3,327,708).

Returning to the drawings, and particularly FIG. 1 and auxiliary FIG. 4, as the cylindrical base web 11 is advanced upwardly around the cylindrical mandrel 15 (by tension applied via a nip between the rolls 49, 50, to be described presently), the web cylinder is first wrapped with a reinforcing web 16, 18 of aligned, highly drafted, synthetic fibers, as described previously. Wrapping is effected by rotating the spindle 34, on which the satellite rolls 36, 38 are mounted, coaxially about the axis of the cylindrical mandrel 15. The webs 16, 18 are withdrawn under slight tension, applied by an internal friction brake (not shown) associated with each of the rolls 36, 38. As the webs 16, 18 are withdrawn from their respective satellite rolls, the webs are positioned by serving bars 51, 52 and thereupon fed to the mandrel with superimposed base web 11.

The rotational speed of the spindle 34 is selected to apply the webs 16, 18 at a predetermined bias angle with respect to the base web 11. It will be apparent that the widths of the webs 16, 18 are dictated by the bias angles so that the reinforcing webs 16, 18 cover the entire surface of the cylindrical base web 11 with essentially no overlap. In particular circumstances, however, some overlap may be desired, and in this event the webs 16, 18 are made wider than would be dictated for a non-overlap coverage.

By way of illustration, where the base web 11 is 80 inches wide and it is desired to produce a laminated product with a 45° bias, a linear speed of the base web 11 of 500 feet per minute requires two satellite rolls 36, 38, each feeding webs 28.6 inches in width and revolving at 74 revolutions per minute. Other bias angles require correspondingly different rotational speeds and web 16, 18 widths.

In the above discussion it is assumed that there are two satellite rolls 36, 38 applying one helical layer for each complete orbit of the spindle 34. While this is the preferred arrangement, it may be desirable to utilize only a single satellite roll, of double width, or else rotate the spindle 34 at twice the rotational speed. In the latter case, the bias angle will of course no longer be 45° in the finished laminate.

Alternatively, three or more satellite rolls may be mounted on each spindle 34. This permits further reduction in the width of each web and/or reduction in rotational speed of the spindle. However, it is apparently optimum practice from the standpoint of convenience in replacing the satellite rolls and in reducing rotational speed of the spindle 34 to use two rolls per spindle. In addition, two rolls provide a balanced spindle assembly, whereas a single roll is inherently unbalanced.

As the base web 11 with its superimposed single wrap of the web 16, 18 advances upward and beyond the position where the first web 16, 18 is applied, a second web 19, 20 is wrapped in the opposite direction around the resulting cylinder. This second web 19, 20 is served from the second pair of satellite rolls 39, 40, mounted on a spindle 35 which rotates in a direction opposite from that of the previously described spindle 34. As shown in FIGS.

1 and 4, the arrangement of the second set of satellite rolls 39, 40 and of their spindle 35 is essentially similar to that of the first set of rolls 36, 38 and their spindle 34, and the same considerations of rotational speed, number of rolls, and web width apply.

In most instances the second web 19, 20 is applied at the same bias angle, although necessarily in the opposite direction, as that of the first web 16, 18. Accordingly, the directions given earlier may be referred to for exemplary conditions.

A desirable feature of the present invention is that the rolls 39, 40 may be located relatively close to the mandrel 15. Not only does this minimize centrifugal force effects, but by maintaining the rolls near the mandrel any adverse effects of wind on the serving webs 19, 20 before the webs wrap around the mandrel 15 are minimized.

After wrapping the second set of webs 19, 20 around the mandrel in a direction opposite that of the first set of webs 16, 18, one or more additional webs may be applied in the same manner. Thus, a laminated product may be produced which has more than two bias reinforcing layers, and again these layers or plies may be of the same or different material than the previously described reinforcing webs.

Once the opposite helices are formed from the webs 16, 18 and 19, 20, at least that portion of the resulting assembly which is in the region of the edges of the original base web 11 is heated under pressure to laminate or bond the several webs near the edges of the first web. This occurs prior to severing the laminate by the slitter disk 22, and is for the purpose of maintaining physical integrity of the laminate as it is restored to a planar state prior to winding the laminate on the winder roll 54.

To this end, and referring particularly to FIGS. 1 and 6, the cylindrical laminate composed of the base web 11 and the two helically superimposed reinforcing webs 16, 18 (or 12) and 19, 20 (or 14) are passed between a calender nip formed by a heated calender roll 21 and a backing roll 55. The adjacent portion of the mandrel 15 has a corresponding aperture 56 to permit contact by the rolls 21 and 55 on opposite sides of the laminate.

The calender roll 21 is heated to a temperature within the range of about 300 to about 400° F. and bears against the backing roll 55 with sufficient pressure to effect a permanent lamination or bonding among the several layers or webs 11, 12, 14. Ordinarily a plurality of pairs of heated calender rolls 21 and associated backup rolls 55 are desirably used, and in the depicted embodiment (FIG. 2) four such pairs are employed, only one of which is in the region of the edges of the original base web 11.

To facilitate movement of the laminate composed of the layers 11, 12, 14 upward along the mandrel 15, it is frequently desirable to drive the calender rolls 21 and/or the backup rolls 55 at a linear speed corresponding to the linear speed of the base web 11. Where this is required or desirable, one or both of the rolls 21, 55 may be driven by suitable linkwork pieces, not shown.

Figure 5:
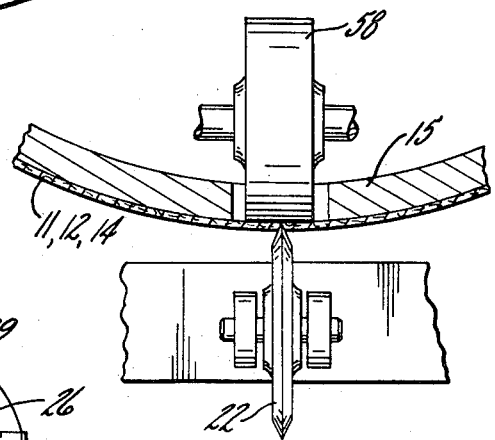
FIG. 5 is an enlarged top sectional view, taken along line 5—5 of FIG. 1, depicting a web severing device.

After passing the calender roll section, the now partly laminated cylinder is severed at a line corresponding to the initial edges of the base web 11. Severing is effected, as shown in FIGS. 1 and 5, by the action of a slitter disk 22 against a suitable backing roll 58, either or both of which may be power driven.

With the cylindrical laminate now severed along a longitudinal line, the web of laminated sheet 24 (FIG. 1) is removed from the cylindrical mandrel 15. This is effected by spreading open the cylinder with guide or spreader bars 32 (FIG. 1) and re-converting the cylinder into a flat sheet 24.

The sheet 24 as it leaves the cylindrical mandrel 15 is flattened, in part by the action of the spreader bars 32 and completely by a laying roll (not shown), and thence passed to the finishing calenders 49, 50. Here, at a temperature again within the range of about 300 to 400° F. for most adhesives, a nip between the rolls completely laminates all of the layers 11, 12, 14 together to form a monolithic laminated product. The product web sheet 24 is, as indicated previously, collected on a winder roll 54.

Turning attention once again to FIG. 7, the product when made as described above contains three layers: first or base web layer 11 of seamless cellulosic wadding, and a pair of 45° cross-bias reinforcing layers 12, 14. These latter layers, if applied according to the optimum practice of the invention outlined earlier, display no overlaps ar gaps, and permit full utilization to be made of the characteristics of the base web 11 plus the strength-affording properties of highly drafted fibrous webs 12 (or 16, 18) and 14 (or 19, 20).

Further, and as is immediately apparent upon inspection of the product, the product is almost completely free of wrinkles or puckering, particularly near the selvedges. This results in large part from avoiding stretching of either the base web 11 or of the reinforcing webs 12, 14, and is assisted by avoiding any pulsating acceleration or deceleration of the satellite rolls.

Thus it is apparent that there has been provided, according to the invention, an outstanding method and apparatus for making an unusually desirable laminated product.

The following is claimed as the invention:

1. A high-speed method of making seamless, wrinkle-free, cross-bias reinforced, porous nonwoven laminates, which method comprises:
   serving a first web of seamless cellulosic wadding;
   continuous shaping said first web longitudinally around a cylindrical mandrel having a circumference throughout its length substantially equal to the width of said first web;
   serving second and third webs from rolls of self-supporting sheets comprising highly drafted synthetic fibers bonded in a spaced open pattern of thermoplastic adhesive,
   in opposite direction relative to one another orbiting said second and third webs around said mandrel to sequentially superimpose continuous opposite helical layers of said second and said third webs around said first web;
   heating said first web with superimposed layers of second and third webs at least in the region of the edges of said first web to reactivate said adhesive in said second and third webs to laminate said webs near the edges of said first web;
   severing said second and third webs along the length of said first web; and,
   withdrawing the resulting cross-bias reinforced laminate.

2. Method of claim 1 wherein said second and said third webs are each biased at an angle of substantially 45° to the first web.

3. Method of claim 1 wherein said first web is uncreped cellulosic wadding.

4. Method of claim 1 wherein said second and third webs consist essentially of said fibers and said adhesive.

5. Method of claim 1 wherein said second and third webs consist essentially of said fiber and said adhesive previously laminated to a layer of cellulosic wadding.

6. Method of claim 1 wherein said adhesive is a plastisol.

7. Method of claim 1 wherein said severed laminate is hot calendered to laminate said webs.

8. Apparatus for making seamless, wrinkle-free cross-bias reinforced, porous nonwoven laminates, which apparatus comprises:
   means for serving a first web of seamless cellulosic wadding,
   means for continuously shaping said first web longitudinally around a cylindrical mandrel having a circumference throughout its length substantially equal to the width of said first web;

means for serving second and third webs from rolls of self-supporting sheets comprising highly drafted synthetic fibers bonded in a spaced open pattern of thermoplastic adhesive, means for in opposite direction relative to one another orbiting said second and said third webs around said mandrel to sequentially superimpose continuous opposite helical layers of said second and said third webs around said first web;

means for heating said first web with superimposed layers of second and third webs at least in the region of the edges of said first web to reactivate said adhesive in said second and third webs to laminate said webs near the edges of said first web, means for severing said second and third webs along the length of said first web, and means for withdrawing the resulting cross-bias reinforced laminate.

9. Apparatus of claim 1 wherein said orbiting means superimpose said second and said third webs at angles of substantially 45° to the first web.

10. Apparatus of claim 9 including means for hot calendering said withdrawn cross-bias reinforced laminate.

11. Apparatus of claim 8 wherein at least two rolls serve each of said second and said third webs.

References Cited

UNITED STATES PATENTS

| | | | |
|---|---|---|---|
| 3,515,621 | 6/1970 | Watson | 156—195 X |
| 3,157,545 | 11/1964 | Waldron et al. | 156—193 X |
| 3,383,261 | 5/1968 | Arnold | 156—195 X |
| 3,448,242 | 1/1970 | Berry | 156—189 X |
| 3,533,882 | 10/1970 | Riese | 156—189 X |
| 2,814,329 | 11/1957 | Sitton | 156—188 |
| 3,189,501 | 6/1959 | White | 156—189 |
| 3,580,784 | 5/1971 | Lee et al. | 156—195 |

CARL D. QUARFORTH, Primary Examiner

G. G. SOLYST, Assistant Examiner

U.S. Cl. X.R.

156—190, 193, 195, 427, 432